(12) United States Patent
Schunk

(10) Patent No.: US 11,223,248 B2
(45) Date of Patent: Jan. 11, 2022

(54) MODIFIED ROTOR OF A RELUCTANCE MACHINE FOR INCREASING TORQUE

(71) Applicant: Siemens Aktiengesellschaft, Munich (DE)

(72) Inventor: Holger Schunk, Lendershausen (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 47 days.

(21) Appl. No.: 16/757,265

(22) PCT Filed: Sep. 4, 2018

(86) PCT No.: PCT/EP2018/073691
§ 371 (c)(1),
(2) Date: Apr. 17, 2020

(87) PCT Pub. No.: WO2019/076523
PCT Pub. Date: Apr. 25, 2019

(65) Prior Publication Data
US 2021/0194299 A1    Jun. 24, 2021

(30) Foreign Application Priority Data

Oct. 20, 2017   (EP) .................................... 17197576

(51) Int. Cl.
*H02K 1/02*       (2006.01)
*H02K 1/24*       (2006.01)
*H02K 1/27*       (2006.01)
*H02K 1/30*       (2006.01)

(52) U.S. Cl.
CPC .............. *H02K 1/246* (2013.01); *H02K 1/02* (2013.01); *H02K 1/278* (2013.01); *H02K 1/30* (2013.01); *H02K 2213/03* (2013.01)

(58) Field of Classification Search
CPC .......... H02K 1/246; H02K 1/02; H02K 1/278; H02K 1/30; H02K 2213/03
USPC ........................................................... 310/46
See application file for complete search history.

(56) References Cited

U.S. PATENT DOCUMENTS

2021/0126514 A1    4/2021   Vollmer

FOREIGN PATENT DOCUMENTS

| CN | 111049296 A | 4/2020 |
|----|----|----|
| CN | 112425035 A | 2/2021 |
| DE | 10 2010 044 046 A1 | 5/2012 |
| EP | 2 775 591 A1 | 9/2014 |
| EP | 3 051 672 A1 | 8/2016 |
| GB | 1114562 A | 5/1968 |

(Continued)

OTHER PUBLICATIONS

PCT International Search Report and Written Opinion of International Searching Authority dated Nov. 22, 2018 corresponding to PCT International Application No. PCT/EP2018/073691 filed Sep. 4, 2018.

*Primary Examiner* — Terrance L Kenerly
(74) *Attorney, Agent, or Firm* — Henry M. Feiereisen LLC

(57) ABSTRACT

In a rotary dynamo-electric reluctance machine, a rotor includes regions of differing magnetic resistances. One region includes material of a first magnetic conductivity. Another region includes material of a second magnetic conductivity which is lower than the first magnetic conductivity. The region having the second magnetic conductivity includes permanent-magnetic material to increase a torque of the reluctance machine.

13 Claims, 4 Drawing Sheets

(56) References Cited

FOREIGN PATENT DOCUMENTS

| WO | WO 2004/070918 A1 | 8/2004 |
| WO | WO 2014/003729 A1 | 1/2014 |

MODIFIED ROTOR OF A RELUCTANCE MACHINE FOR INCREASING TORQUE

CROSS-REFERENCES TO RELATED APPLICATIONS

This application is the U.S. National Stage of International Application No. PCT/EP2018/073691, filed Sep. 4, 2018, which designated the United States and has been published as International Publication No. WO 2019/076523 A1 and which claims the priority of European Patent Application, Serial No. 17197576.6, filed Oct. 20, 2017, pursuant to 35 U.S.C. 119(a) (d).

BACKGROUND OF THE INVENTION

The invention relates to a rotor of a rotary dynamo-electric reluctance machine having a direction of rotation about an axis of rotation, wherein, viewed in the direction of rotation, the rotor, comprises regions of differing magnetic resistance, wherein of these regions, regions with material of a first magnetic conductivity μr>50 form poles with the pole number 2p of the rotor, wherein these regions border non-magnetic material, wherein, viewed in the direction of rotation, the pole pitch extends from the center of a region with a second magnetic conductivity μr<5 which is lower than the first magnetic conductivity to the center of the next region with the second magnetic conductivity, wherein, viewed in the direction of rotation, at least on a surface of the rotor, a width of the regions with the second magnetic conductivity is between 1% and 50% of the pole pitch, wherein a radial depth of a pole, at least in sections, corresponds to more than 10% of a length of an arc of the pole pitch.

The patent EP2775591A1 discloses a rotor of a rotary dynamo-electric reluctance machine having a direction of rotation about an axis of rotation, wherein, viewed in the direction of rotation, the rotor comprises regions of differing magnetic resistance, wherein regions with material of good magnetic conductivity (μr>50) form poles with the pole number 2p of the rotor, wherein these regions are surrounded by non-magnetic material (μr<5), wherein, viewed in the direction of rotation, the pole pitch extends from the center of a non-magnetic region to the center of the next non-magnetic region.

The disadvantage of the disclosed rotor of the rotary dynamo-electric reluctance machine is the low torque of the reluctance machine.

SUMMARY OF THE INVENTION

Therefore, the invention is based on the object of improving the torque of such a reluctance machine.

The object is achieved by a rotor of rotary dynamo-electric reluctance machine having a direction of rotation about an axis of rotation, wherein the rotor, viewed in the direction of rotation, comprises regions of differing magnetic resistance, wherein of these regions, regions with material of a first magnetic conductivity μr>50 form poles with the pole number 2p of the rotor, wherein these regions border non-magnetic material with μr<5, wherein the pole pitch, viewed in the direction of rotation, extends from the center of a region with a second magnetic conductivity μr<5 which is lower than the first magnetic conductivity to the center of the next region with the second magnetic conductivity, wherein a width of the regions with the second magnetic conductivity, viewed in the direction of rotation, at least on a surface of the rotor, is between 1% and 50% of the pole pitch, wherein a radial depth of a pole, at least in sections, corresponds to more than 10% of a length of an arc of the pole pitch, wherein the region with the second magnetic conductivity comprises permanent-magnetic material to increase a torque of the reluctance machine.

The object is further achieved by a rotary dynamo-electric reluctance machine with such a rotor.

Preferably, μr>500 applies for the first magnetic conductivity.

Possible examples of materials with the first magnetic conductivity include structural steel, magnetic sheet steel or an iron-cobalt alloy.

Materials with a magnetic conductivity of μr>2000, in particular 3000<μr<4000 are particularly suitable.

Possible examples of materials with the lower second magnetic conductivity include stainless steel, air, aluminum, copper, wood, rubber or plastic.

Advantageously, the materials with the lower second magnetic conductivity are also electrically non-conductive, such as, for example, plastic.

One advantage of the rotor embodied in this way is that the torque or the torque constant, which are usually low in reluctance machines, are increased.

A further advantage of the rotor embodied in this way is that few ohmic losses occur. In addition, few iron losses occur. Therefore, the rotor described is very energy efficient.

A further advantage of the invention is that electrical machines with a rotational movement based on the reluctance principle are inexpensive.

According to the invention, the rotor comprises permanent-magnetic material. This serves to increase the torque. Herein, the region with the second magnetic conductivity can, for example, consist entirely of permanent-magnetic material or can be equipped with individual permanent magnets. For example, a laminated core can be equipped with permanent magnets.

Preferably, rare-earth magnets, for example neodymium iron boron and/or samarium cobalt, are used as the permanent-magnetic material. However, it is also possible to use steel, aluminum nickel cobalt, bismanol and/or ferrites as the permanent-magnetic material. It is also possible to use plastic magnetic material as the permanent-magnetic material.

In one advantageous embodiment of the invention, the permanent-magnetic material has radial magnetization.

This serves to increase the magnetic field strength in the air gap.

This has a positive effect on the increase in torque. Herein, the torque can be increased by a factor of 1.5-2.

DETAILED DESCRIPTION OF PREFERRED EMBODIMENTS

In a further advantageous embodiment of the invention, a further region comprising a material of a first or third magnetic conductivity μr>50 extends substantially concentrically to the axis of rotation in order to achieve a magnetic yoke.

Preferably, μr>500 applies for the first or third magnetic conductivity,

This preferably serves to optimize the efficiency of the reluctance machine since the magnetic field strength in the air gap is increased. Thus, less current is required with the same torque or a higher torque is achieved with the same current.

Materials with the third magnetic conductivity can, for example, be structural steel, magnetic sheet steel or an iron-cobalt alloy.

Materials with a magnetic conductivity of μr>2000 are particularly suitable.

However, the magnetic yoke can also be achieved via a shaft of the rotor.

In a further advantageous embodiment of the invention, the regions are connected to at least one connecting element.

The connecting element is used to connect at least two of the named regions to one another.

The connecting element can result from at least one type of connection such as, for example, bonding, welding, soft soldering, hard soldering and/or taping.

The connecting element can also be embodied as a bolt, pin, rivet and/or a nail and preferably comprises a metal and/or another material.

In a further advantageous embodiment of the invention, the connecting element is embodied as a screw.

A connecting element embodied as a screw is advantageous because it is easy to install.

Preferably, a magnetically conductive material is used as the material for the screw. However, all typical screw materials can be used.

Preferably, at least one screw connects a region with material of the first magnetic conductivity to the shaft.

Preferably, at least one screw connects a region with material of the first magnetic conductivity to a further region with material of the first and/or third magnetic conductivity and to the shaft.

Preferably, at least one screw connects a region with material of the first magnetic conductivity to a region with material of the second magnetic conductivity and to a further region with material of the first and/or third magnetic conductivity and to the shaft.

Preferably, in each case a screw connects each region with material of the first magnetic conductivity to the shaft.

Preferably, in each case a screw connects each region with material of the first magnetic conductivity to a, preferably underlying, further region with material of the first and/or third magnetic conductivity and to the shaft.

Preferably, in each case a screw connects each region with material of the first magnetic conductivity to a, preferably underlying, region with material of the second magnetic conductivity and to a, preferably underlying, further region with material of the first and/or third magnetic conductivity and to the shaft.

Preferably, each screw is substantially arranged centrally between a front axial end and a rear axial end of the shaft.

Preferably, the shaft is embodied as a hollow shaft.

In a further advantageous embodiment of the invention, the connecting element includes two screws.

Preferably, exactly two screws connect a region with material of the first magnetic conductivity to the shaft.

Preferably, exactly two screws connect a region with material of the first magnetic conductivity to a further region with material of the first and/or third magnetic conductivity and to the shaft.

Preferably, exactly two screws connect a region with material of the first magnetic conductivity to a region with material of the second magnetic conductivity and to a further region with material of the first and/or third magnetic conductivity and to the shaft.

Preferably, in each case exactly two screws connect each region with material of the first magnetic conductivity to the shaft.

Preferably, in each case exactly two screws connect each region with material of the first magnetic conductivity to a, preferably underlying, further region with material of the first and/or third magnetic conductivity and to the shaft.

Preferably, in each case exactly two screws connect each region with material of the first magnetic conductivity to a, preferably underlying, region with material of the second magnetic conductivity and to a, preferably underlying, further region with material of the first and/or third magnetic conductivity and to the shaft.

Preferably, one of the two screws is arranged substantially at the front axial end of the shaft and the other one of the two screws is arranged substantially at the rear axial end of the shaft.

In a further advantageous embodiment of the invention, the regions are connected by means of a material connection.

The connection can result from at least one type of connection such as, for example, bonding, welding, soft soldering and/or hard soldering.

The named types of connection enable a material connection.

In a further advantageous embodiment of the invention, the regions are connected by means of a frictional connection.

The connection can result from at least one type of connection such as, for example, taping.

The named type of connection enables a frictional connection.

In a further advantageous embodiment of the invention, the regions are arranged parallel to the axis of rotation.

In a further advantageous embodiment of the invention, the regions are arranged obliquely with respect to the axis of rotation.

This arrangement has the advantage that it can reduce ripple and/or a detent torque of the rotor.

The described embodiment of the rotor has the advantage that a rotary dynamo-electric reluctance machine with such a rotor has two torque maxima. A first torque maximum substantially results from the reluctance force of the reluctance machine. A second torque maximum substantially results from the Lorentz force, which acts from a rotor magnetic field—as described above, the rotor comprises permanent-magnetic material—on a stator winding system.

However, preferably, the action of both forces is always out of phase. The torque maxima are produced in this way.

Thus, the rotary dynamo-electric reluctance machine with such a rotor has two torque constants, which can be adjusted via an energization angle, preferably by means of an inverter arranged upstream of the rotary dynamo-electric reluctance machine.

The invention has the advantage that two parallel magnetic circuits can be generated and these can be separated from one another electromagnetically. Herein, a first magnetic circuit includes the stator and at least one flux concentrating piece and uses the reluctance force. A second magnetic circuit includes the stator, permanent-magnetic material and an optional region in order to achieve a magnetic yoke—for example a yoke shaft—and uses the Lorentz force.

In this way, the magnetic circuits can complement each other and in total deliver a higher torque at the same current.

In a further advantageous embodiment of the invention, the rotor is embodied as a rotor module. At least two rotor modules are joined to produce the rotor. Herein, the rotor modules can also be joined in a manner corresponding to an oblique arrangement of the regions with respect to the axis of rotation.

A rotary dynamo-electric reluctance machine with such a rotor can be used particularly efficiently in process technology with pumps, fans, compressors, mixers and centrifuges, in conveyor systems and also in machine engineering. The rotary dynamo-electric reluctance machine with such a rotor is generally universally applicable.

The following describes and explains the invention in more detail with reference to the exemplary embodiments depicted in the figures, which show:

FIG. 1 the prior art,

FIG. 2 an embodiment according to the invention of a reluctance machine with a rotor to increase a torque, FIG. 3 an embodiment of the rotor with a magnetic yoke via a shaft, FIG. 4 an embodiment of the rotor with an enlarged region with a material with a lower second magnetic conductivity, FIG. 5 an embodiment of the rotor, wherein the regions are in each case connected to the shaft with one screw per pole, FIG. 6 an embodiment of the rotor, wherein the regions are connected to the shaft with two screws per pole.

Figure 1:
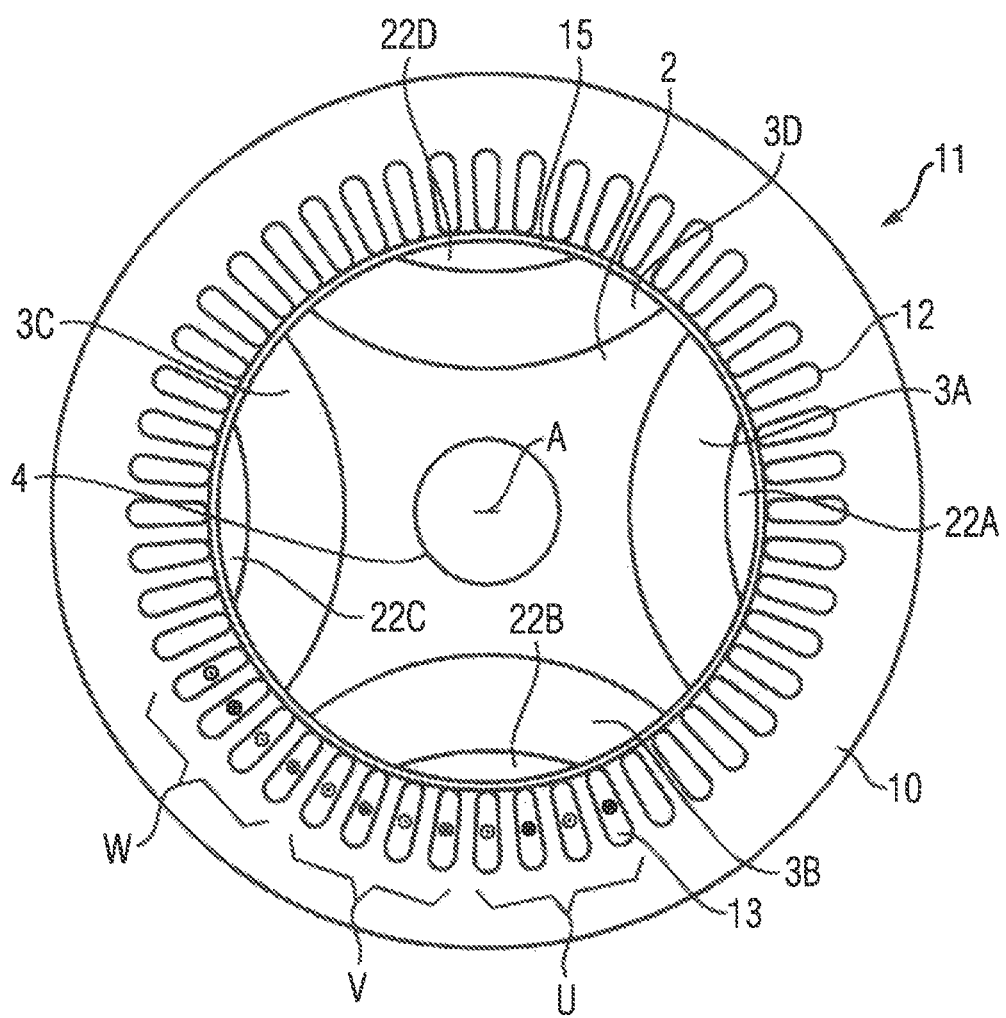
FIG. 1 shows the prior art. This figure shows a reluctance machine 11 with a region 2 and regions 3A, 3B, 3C and 3D. The regions 3A to 3D comprise a material of a first magnetic conductivity ($\mu r > 50$) and form poles with the pole number 2p of the rotor.

The regions 3A to 3D border non-magnetic material ($\mu r < 5$).

The region 2 comprises a material with a second magnetic conductivity ($\mu r < 5$) which is lower than the first magnetic conductivity. The region 2 borders a shaft 4.

Viewed in the direction of rotation about the axis of rotation A, the regions 3A to 3D border the region 2.

They also border an air gap 15 and a non-magnetic material in segment sections 22A, 22B, 22C and 22D.

In order to avoid a pumping effect which occurs in the case of geometrically non-circular rotors or noise, the segment sections 22A to 22D are filled with non-magnetic material. The segment sections 22A to 22D with non-magnetic material are connected to the respective magnetic region 3A to 3D with suitable means, for example by means of tapes or material connections.

A stator 10 comprises a stator winding system 13 in slots 12 with the three phases U, V and W.

This reluctance machine is also referred to as an inverse reluctance machine.

Figure 2:
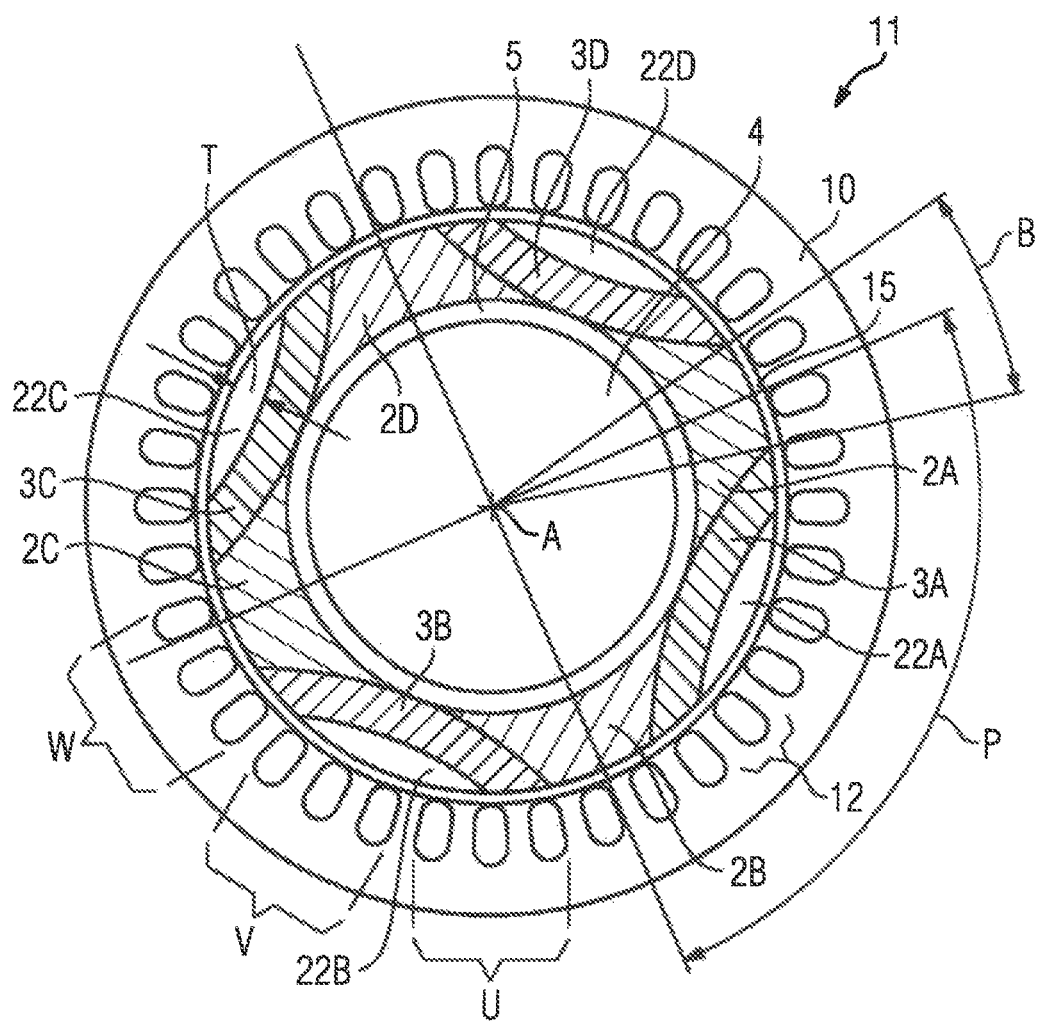

FIG. 2 shows an embodiment according to the invention of a reluctance machine 11 with a rotor to increase a torque.

Reference characters described in FIG. 1 are also valid for FIG. 2 and all the following figures and will not be explained again for reasons of clarity. The region 2 shown in FIG. 1 is divided into several regions 2A, 2B, 2C and 2D due to different, but quite feasible region ratios.

FIG. 2 also shows a pole pitch P. Viewed in the direction of rotation, in this figure, this extends from the center of a region 2A with a second magnetic conductivity which is lower than the first magnetic conductivity to the center of the next region 26 with the second magnetic conductivity.

According to the invention, the regions 2A to 2D comprise permanent-magnetic material in order to increase the torque of the reluctance machine 11. Herein, the regions 2A to 2D can, for example, consist entirely of permanent-magnetic material or can be equipped with individual permanent magnets. For example, a laminated core can be equipped with permanent magnets.

Viewed in the direction of rotation, a width B of each of regions 2A to 2D with the second magnetic conductivity is between 1% and 50% of the pole pitch at least on a surface of the rotor. The width B is preferably between 10% and 30% of the pole pitch.

FIG. 2 also shows a further region 5 comprising a material of a first or third magnetic conductivity. The region 5 extends substantially concentrically to the axis of rotation A in order to achieve a magnetic yoke. In this figure, the region 5 borders the shaft 4.

This figure further shows a radial depth T of a pole, which, at least in sections, corresponds to more than 10% of a length of an arc of the pole pitch P.

The stator preferably comprises a one-, two- or multi-phase primary winding. Preferably, a suitable integral slot winding is used for this. However, a fractional slot winding is also conceivable.

This figure shows a development of the inverse reluctance machine in FIG. 1.

Figure 3:
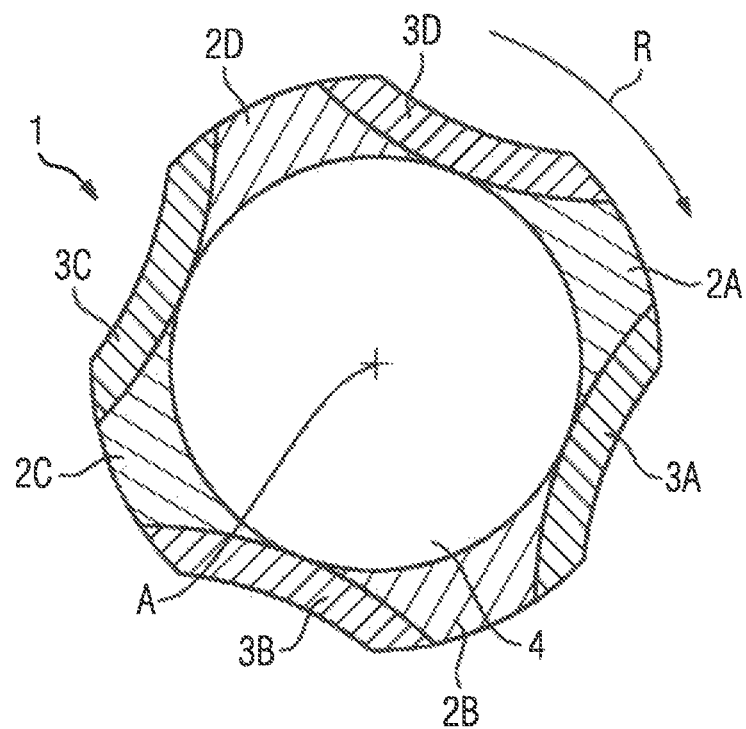

Reference characters described in FIG. 2 are also valid for FIG. 3 and all the following figures and will not be explained again for reasons of clarity.

FIG. 3 shows an embodiment of the rotor 1 with a magnetic yoke via a shaft 4.

The regions 3A to 3D with material of a first magnetic conductivity form poles with the pole number 2p of the rotor 1 and directly border the shaft 4 in this figure. In this figure, the direction of rotation R of the rotor 1 is right-rotating. However, a left-rotating direction of rotation is also conceivable.

According to the invention, the regions 2A to 2D comprise permanent-magnetic material to increase the torque of the reluctance machine 11.

Reference characters described with reference to FIG. 3 are also valid for FIG. 4 and all the following figures and will not be explained again for reasons of clarity.

Figure 4:
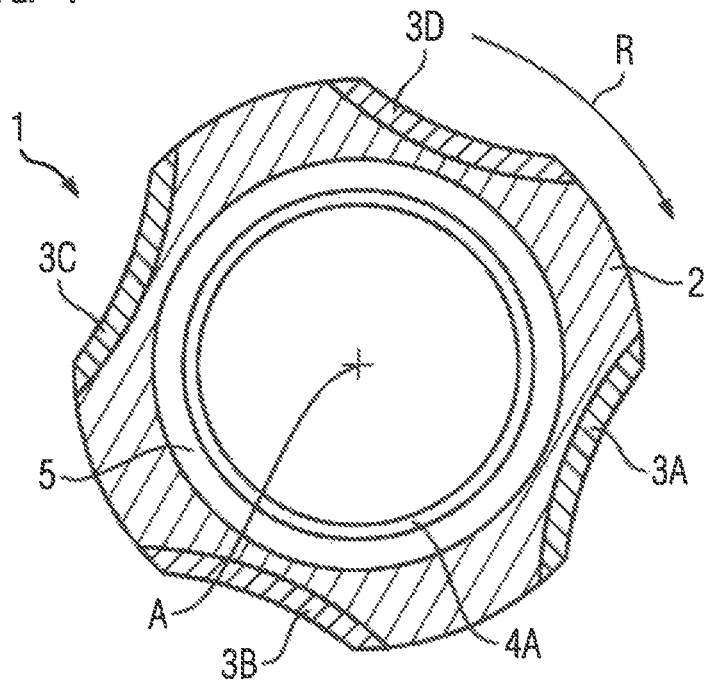

FIG. 4 shows an embodiment of the rotor 1 with a connected region 2 with a material with a lower second magnetic conductivity.

According to the invention, the region 2 comprises permanent-magnetic material to increase the torque of the reluctance machine 11.

In this figure, the regions 3A to 3D are narrower than in FIG. 3. This figure also shows the region 5, which comprises a material of a first and/or third magnetic conductivity. The region 5 extends substantially concentrically to the axis of rotation A in order to achieve a magnetic yoke and in this figure borders the shaft 4A embodied as a hollow shaft 4A.

This has the advantage that a higher torque is achieved by a higher magnetic field in the air gap.

Figure 5:
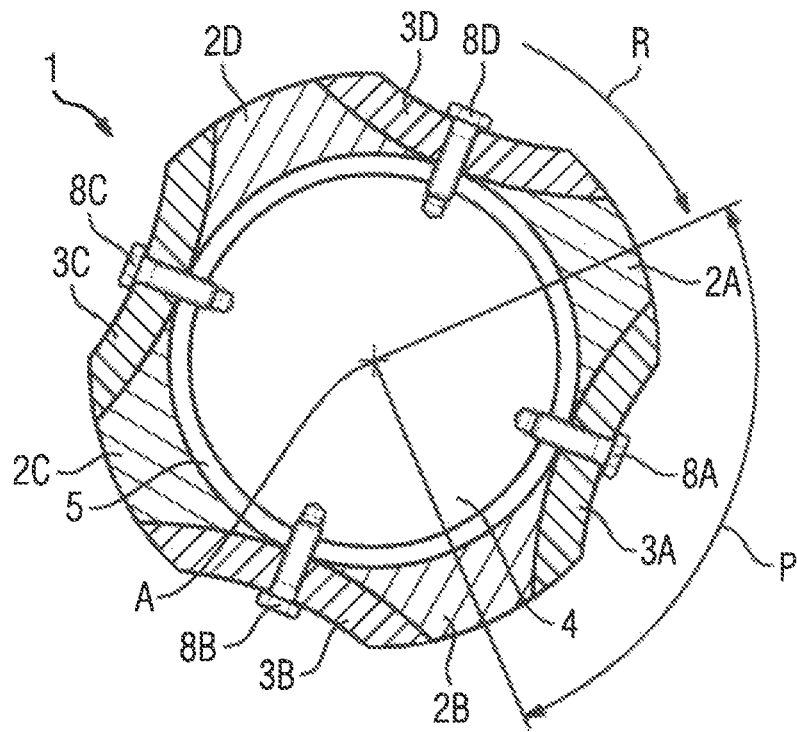

FIG. 5 shows an embodiment of the rotor 1, wherein the regions 3A to 3D are in each case connected to the shaft 4 with one screw 8A, 8B, 8C or 8D per pole.

In this figure, in each case a screw 8A to 8D connects the respective region 3A to 3D to the shaft 4.

The shaft 4 can be embodied as a hollow shaft.

In this figure, in each case a screw 8A to 8D connects each region 3A to 3D to the underlying region 5 and to the shaft 4. This also fixes each region 2A to 2D.

In this figure, each screw 8A to 8D is substantially arranged in the center of the pole pitch P. In this figure, each screw 8A to 8D is substantially arranged centrally between a front axial end and a rear axial end of the shaft.

Figure 6:
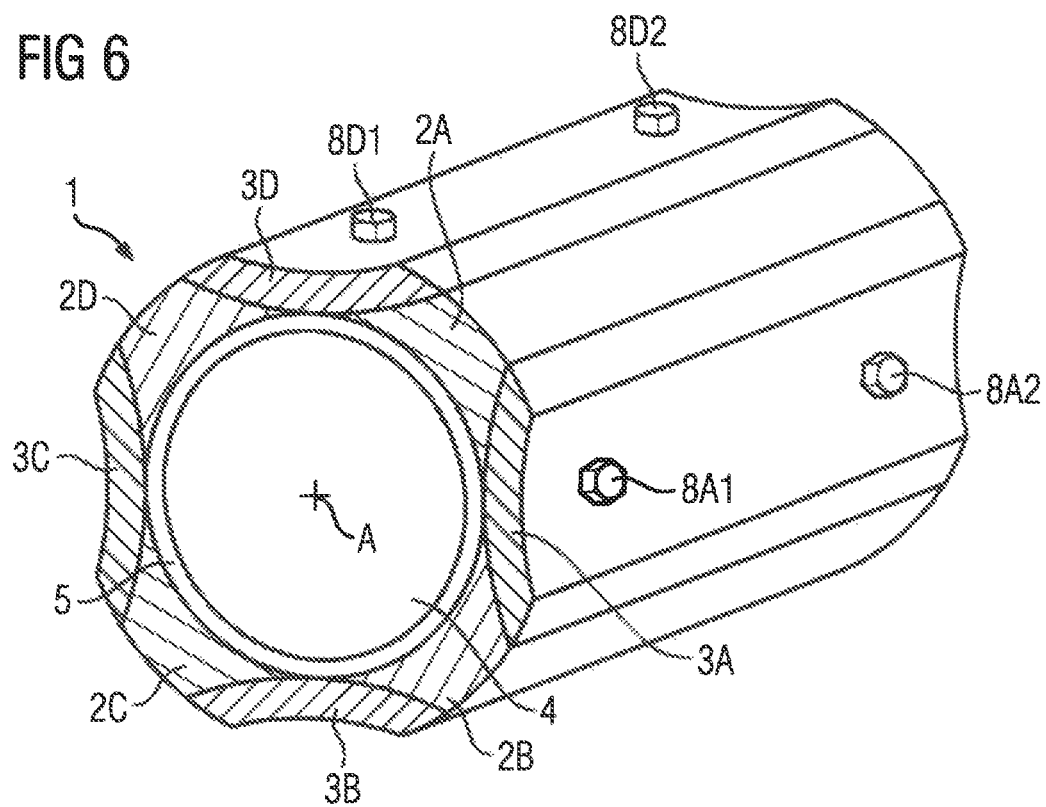

FIG. 6 shows an embodiment of the rotor 1, wherein the regions 3A to 3D are connected to the shaft 4 with two screws per pole.

For purposes of illustration, only the screws 8A1 and 8A2 (in the case of region 3A) and 8D1 and 8D2 (in the case of region 3D) are shown in this figure. However, preferably the regions 3B and 3C also comprise two screws in each case.

In this figure, in each case exactly two screws 8A1 to 8D2 connect each region 3A to 3D with the shaft 4.

As a result, in each case exactly two screws 8A1 to 8D2 connect each region 3A to 3D to the underlying region 5 and to the shaft 4. In this way, each region 2A to 2D is also fixed.

In this figure, the screw 8A1 is, for example, substantially arranged at the front axial end of the shaft 4 and the screw 8A2 is substantially arranged at the rear axial end of the shaft 4.

It is also possible for three or more screws to be used for the connection.

What is claimed is:

1. A rotary dynamo-electric reluctance machine having a direction of rotation about an axis of rotation, said reluctance machine comprising a rotor interacting with a stator via an air gap, said rotor comprising:
    first and second regions of differing magnetic resistance viewed in the direction of rotation, said first region having a material of a first magnetic conductivity µr>50 and forming poles with a pole number 2p of the rotor, with the first region bordering a non-magnetic material with µr<5, and said second region having a second magnetic conductivity µr<5 which is lower than the first magnetic conductivity, said second region comprising a permanent-magnetic material to increase a torque of the reluctance machine, said permanent-magnetic material having a radial magnetization to increase a magnetic field strength in the air gap,
    wherein a pole pitch extends from a center of the second region viewed in the direction of rotation to a center of a further said second region, said second region having, when viewed in the direction of rotation, a width which is between 1% and 50% of the pole pitch at least on a surface of the rotor, wherein the poles have each at least one section defined by a radial depth which corresponds to more than 10% of a length of an arc of the pole pitch, and
    wherein the rotor is configured to provide the rotary dynamo-electrical reluctance machine with two torque constants which adjustable via an energization angle.

2. The reluctance machine of claim 1, wherein the two torque constants are adjustable by an inverter arranged upstream of the rotary dynamo-electric reluctance machine.

3. The reluctance machine of claim 1, wherein the rotor is configured to provide the rotary dynamo-electric reluctance machine with two torque maxima, with one of the two torque maxima substantially resulting from a reluctance force of the rotary dynamo-electrical reluctance machine, and the other one of the two torque maxima substantially resulting from a Lorentz force which acts from a rotor magnetic field on a winding system of the stator.

4. The reluctance machine of claim 3, further comprising two parallel magnetic circuits which are separable from one another electromagnetically, with one of the two magnetic circuits using the reluctance force and including the stator and at least one flux concentrating piece, and the other one of the two magnetic circuits using the Lorentz force and including the stator and the permanent-magnetic material to form a magnetic yoke.

5. The reluctance machine of claim 4, wherein the two magnetic circuits complement each other and in total deliver a higher torque at a same current.

6. The reluctance machine of claim 4, wherein the other one of the two magnetic circuits comprises another region to form the magnetic yoke.

7. The reluctance machine of claim 1, wherein the radial magnetization of the permanent-magnetic material increases a torque of the reluctance machine by a factor of 1.5-2.

8. The reluctance machine of claim 1, wherein the rotor includes a third region comprising a material of the first or of a third magnetic conductivity µr>50 extending concentrically to the axis of rotation, thereby forming a magnetic yoke.

9. The reluctance machine of claim 8, wherein the first, second and third regions are connected to at least one connecting element.

10. The reluctance machine of claim 9, wherein the at least one connecting element is a screw.

11. The reluctance machine of claim 8, wherein the first, second, and third regions are connected by a material connection.

12. The reluctance machine of claim 8, wherein the first, second, and third regions are arranged parallel to the axis of rotation.

13. The reluctance machine of claim 8, wherein the first, second, and third regions are arranged obliquely with respect to the axis of rotation.

* * * * *